US010852452B2

(12) United States Patent
Cao Minh et al.

(10) Patent No.: US 10,852,452 B2
(45) Date of Patent: Dec. 1, 2020

(54) SYSTEMS AND METHODS FOR DETERMINING LIQUID SATURATION FROM OVERLAPPING NMR DISTRIBUTIONS

(71) Applicant: Schlumberger Technology Corporation, Sugar Land, TX (US)

(72) Inventors: Chanh Cao Minh, Katy, TX (US); Vikas Jain, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 32 days.

(21) Appl. No.: 16/246,603

(22) Filed: Jan. 14, 2019

(65) Prior Publication Data

US 2019/0219727 A1 Jul. 18, 2019

Related U.S. Application Data

(60) Provisional application No. 62/616,537, filed on Jan. 12, 2018.

(51) Int. Cl.
*G01V 3/32* (2006.01)
*G01N 24/08* (2006.01)
*G01V 3/14* (2006.01)

(52) U.S. Cl.
CPC ............ *G01V 3/32* (2013.01); *G01N 24/081* (2013.01); *G01V 3/14* (2013.01)

(58) Field of Classification Search
CPC ........... G01V 3/32; G01V 3/14; G01N 24/081
See application file for complete search history.

(56) References Cited

U.S. PATENT DOCUMENTS

2016/0230548 A1* 8/2016 Gzara ...................... G01V 3/32

OTHER PUBLICATIONS

Cao Minh C., Crary S., Singer P., Valori A., Bachman N., Hursan G., Ma S., Belowi A., Kraishan G., 2015, "Determination of Wettability from Magnetic Resonance Relaxation and Diffusion Measurements on Fresh-State Cores6", paper III presented at the SPWLA 56th Annual Logging Symposium, Jul. 18-22, Long Beach, California, USA. (15 pages).
Cao Minh C., Jain V., Griffiths R., Maggs D, 2016, "NMR T2 Fluids Substitution", presented at the SPWLA 57th Annual Logging Symposium, Jun. 25-29, Reykjavik, Iceland. (12 pages).
Straley, C., Morriss C. E., Kenyon W. E., and Howard J. J., 1995, NMR in partially saturated sandstones: Laboratory insights into free fluid index, and comparison with borehole logs, The Log Analyst, 36(1), 40-56.

* cited by examiner

*Primary Examiner* — Susan S Lee
(74) *Attorney, Agent, or Firm* — Trevor G. Grove

(57) ABSTRACT

A liquid saturation may be identified from nuclear magnetic resonance (NMR) data having overlapping peaks indicative of two liquids by, generally, identifying a first endpoint based at least in part on the T2 NMR data for the first liquid, and identifying a second endpoint based at least in part on the T2 NMR data for the second liquid. Then, the liquid saturation is identified by relating a composition of the first liquid for an overlapping distribution region based at least in part on the first endpoint and the second endpoint. In some embodiments, the liquid saturation is identified based on an interpolation between the first endpoint and the second endpoint.

14 Claims, 7 Drawing Sheets

SYSTEMS AND METHODS FOR DETERMINING LIQUID SATURATION FROM OVERLAPPING NMR DISTRIBUTIONS

BACKGROUND

This disclosure relates generally to identifying liquid saturation from overlapping distributions in NMR data to improve identification of hydrocarbon deposits.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties or characteristics of the geological formation surrounding the wellbore.

One type of downhole well-logging tool uses nuclear magnetic resonance (NMR) to measure the response of nuclear spins in formation fluids to applied magnetic fields. Many NMR tools have a permanent magnet that produces a static magnetic field at a desired test location at a depth of a well (e.g., where the fluid is located). The static magnetic field produces an equilibrium magnetization in the fluid that is aligned with a magnetization vector along the direction of the static magnetic field. A transmitter antenna produces a time-dependent radio frequency magnetic field that is perpendicular to the direction of the static field. The radio frequency magnetic field produces a torque on the magnetization vector that causes it to rotate about the axis of the applied radio frequency magnetic field. The rotation results in the magnetization vector developing a component perpendicular to the direction of the static magnetic field. This causes the magnetization vector to align with the component perpendicular to the direction of the static magnetic field, and to precess around the static field. This produces NMR measurements which contains data indicative of multiple components within the well. Certain components may have overlapping data and, thus, it may be difficult to accurately determine the amounts of each component.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a method for identifying a liquid saturation from T2 nuclear magnetic resonance (NMR) data having a first component of T2 NMR data due to a first liquid that overlaps with a second component of T2 NMR data due to a second liquid. The method includes receiving T2 NMR data, wherein the T2 NMR data comprises first T2 NMR data due to the first liquid and second T2 NMR data due to the second liquid. The method also includes identifying a first endpoint corresponding to a T2 peak of the first liquid in the absence of the second liquid based at least in part on the first T2 NMR data. Further, the method includes identifying a second endpoint corresponding to a T2 peak of the second liquid in the absence of the first liquid based at least in part on the second T2 NMR data. Further still, the method includes identifying a liquid saturation of a composition of the first liquid for a region of the T2 NMR data where the first T2 NMR data overlaps with the second T2 NMR data based at least in part on the first endpoint and the second endpoint.

Another embodiment of the present disclosure relates to one or more tangible, non-transitory, machine-readable media comprising instructions configured to cause a processor to receive T2 NMR data, wherein the T2 NMR data comprises first T2 NMR data due to water and second T2 NMR data due to the at least one hydrocarbon. The instructions also cause the processor identify a first endpoint corresponding to a T2 peak of the water in the absence of the at least one hydrocarbon based at least in part on the first T2 NMR data. Further, the instructions cause the processor identify a second endpoint corresponding to a T2 peak of the at least one hydrocarbon in the absence of the water based at least in part on the second T2 NMR data. Further still, the instructions cause the processor to identify a cutoff point between the T2 peak of the water and the at least one hydrocarbon. Even further, the instructions cause the processor to identify the water saturation relating to an amount of water for a region within a geological formation of the T2 NMR data where the first T2 NMR data overlaps with the second T2 NMR data based at least in part on the first endpoint, the second endpoint, and the cutoff point.

Another embodiment of the present disclosure relates to a system for identifying a water saturation from T2 nuclear magnetic resonance (NMR) data having a first component of T2 NMR data due to water that overlaps with a second component of T2 NMR data due to at least one hydrocarbon. The system includes a downhole tool configured to receive NMR data. The system also includes a processor. Further, the system includes a memory storing instructions configured to be executed by the processor, the instructions comprising instructions to receive T2 NMR data, wherein the T2 NMR data comprises first T2 NMR data due to water and second T2 NMR data due to the at least one hydrocarbon. The instructions also include instructions to identify a first endpoint corresponding to a T2 peak of the water in the absence of the at least one hydrocarbon based at least in part on the first T2 NMR data. Further, the instructions include instructions to identify a second endpoint corresponding to a T2 peak of the at least one hydrocarbon in the absence of the water based at least in part on the second T2 NMR data. Even further, the instructions include instructions to identify a cutoff point between the T2 peak of the water and the at least one hydrocarbon. Further still, the instructions include instructions to identify the water saturation relating to an amount of water for a region within a geological formation of the T2 NMR data where the first T2 NMR data overlaps with the second T2 NMR data based at least in part on the first endpoint, the second endpoint, and the cutoff point.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
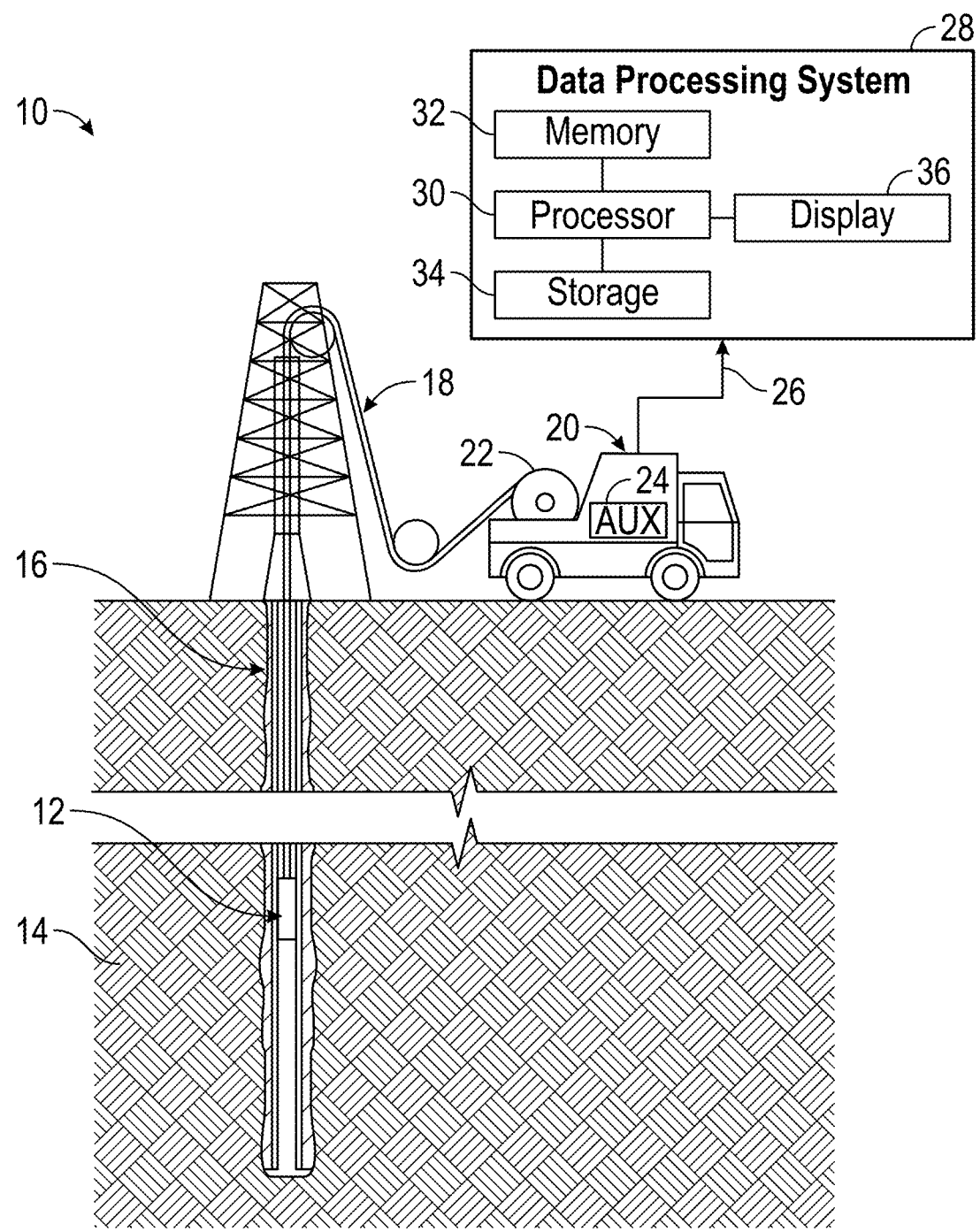
FIG. 1 is a partial cross-sectional view of a well-logging system that may be used to receive and/or analyze NMR data, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In general, oil and gas exploration organizations may make certain oil and gas production decisions, such as determining where to drill and/or whether to perform enhanced oil recovery in a well, based on well log data. One type of well log measurement that is used for generating well log data is a nuclear magnetic resonance (NMR) measurement. Such well log data, or NMR data, may be used to determine a volume of hydrocarbons and/or water, which, in turn, may be used to inform the production decisions. In some operations, the NMR data may be T1, T2, diffusion (D), or any combination of these. While some approaches may estimate Sw from a single T2 distribution containing non-overlapping water and hydrocarbon T2 distributions, in some cases, the T2 distributions of water and hydrocarbon distribution may overlap. The degree of overlap and a location (e.g., spectral position) of the T2 distributions for each source of the T2 distributions may vary with water saturation, Sw, which further complicates determination or identification of the volume of the sources and, in turn, could hinder oil and gas production decisions.

The present disclosure relates to systems and methods for determining saturated-water ($S_w$) values from overlapping water and hydrocarbon NMR T2 distributions. In general, the techniques of the present disclosure involve identifying (e.g., calculating) Sw by identifying T2 log-mean values of a formation containing 100% water (e.g., a water endpoint) and a T2 log-mean of hydrocarbon (e.g., a hydrocarbon endpoint). Further, the techniques include deriving Sw by interpolating in the logarithmic space the T2 log-mean value of the overlapping.

With this in mind, FIG. 1 illustrates a well-logging system 10 that may employ the systems and methods of this disclosure. The well-logging system 10 may be used to convey a downhole tool 12 through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that obtains NMR logging measurements through depths of the wellbore 16.

Many types of downhole tools may obtain NMR logging measurements in the wellbore 16. These include, for example, nuclear magnetic resonance (NMR) tools such as the Combinable Magnetic Resonance (CMR) tool, the Magnetic Resonance Scanner (MRX) tool, and the ProVISION tool by Schlumberger Technology Corporation. In general, NMR tools may have a permanent magnet that produces a static magnetic field at a desired test location (e.g., where the fluid is located). The static magnetic field produces an equilibrium magnetization in the fluid that is aligned with a magnetization vector along the direction of the static magnetic field. A transmitter antenna produces a time-dependent radio frequency magnetic field that is perpendicular to the direction of the static field. The radio frequency magnetic field produces a torque on the magnetization vector that causes it to rotate about the axis of the applied radio frequency magnetic field. The rotation results in the magnetization vector developing a component perpendicular to the direction of the static magnetic field. This causes the magnetization vector to align with the component perpendicular to the direction of the static magnetic field, and to precess around the static field.

The time for the magnetization vector to re-align with the static magnetic field is known as the longitudinal magnetization recovery time, or "T1 relaxation time." The spins of adjacent atoms precess in tandem synchronization with one another due to the precession of the magnetization vector. The time for the precession of the spins of adjacent atoms to break synchronization is known as the transverse magnetization decay time, or "T2 relaxation time." Thus, the measurements obtained by the downhole tool 12 may include distributions of the first relaxation time T1, the second relaxation time T2, or molecular diffusion D, or a combination of these. For example, a downhole NMR tool may measure just T2 distribution, or the tool may measure a joint T1-T2 distribution or T1-T2-D distribution.

For each depth of the wellbore 16 that is measured, a downhole NMR tool may generate NMR logging measurements that include a distribution of amplitudes of T2 relaxation time, T1 relaxation time, diffusion, or a combination thereof. This list is intended to present certain examples and is not intended to be exhaustive. Indeed, any suitable downhole tool 12 that obtains NMR logging measurements may benefit from the systems and methods of this disclosure.

The downhole tool 12 may provide NMR logging measurements 26 to a data processing system 28 via any suitable telemetry (e.g., via electrical signals pulsed through the geological formation 14 or via mud pulse telemetry). The data processing system 28 may process the NMR logging measurements 26 to identify patterns in the NMR logging measurements 26. The patterns in the NMR logging measurements 26 may indicate certain properties of the wellbore 16 (e.g., viscosity, porosity, permeability, relative proportions of water and hydrocarbons, and so forth) that might otherwise be indiscernible by a human operator.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the NMR logging measurements 26.

Figure 2:
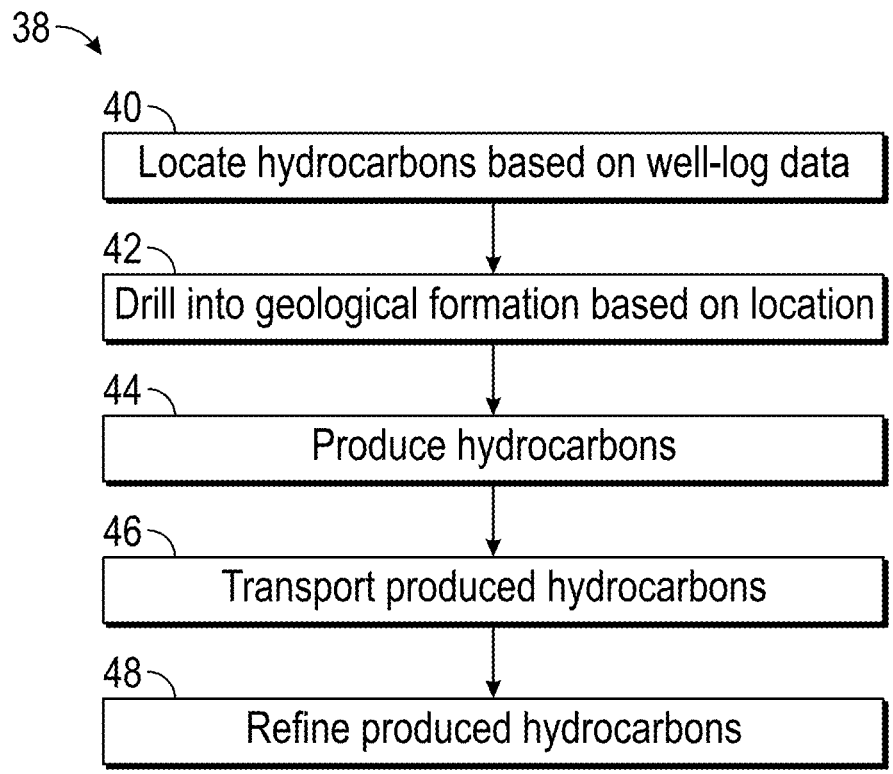
FIG. 2 illustrates a flow chart of various processes that may be performed based on analysis of well logs including NMR data, in accordance with an embodiment.

As discussed herein, NMR data may be used to inform certain oil and gas operation decisions. FIG. 2 illustrates a flow chart 38 of various processes that may be performed based on analysis of well logs, in accordance with aspects of the present disclosure. A location of hydrocarbon deposits within a geological formation may be identified (block 40) based on well-log data. As discussed herein, the well log data may be generated via NMR measurements, and as such, may be referred to as "NMR well log data" or "NMR data." In some embodiments, the well-log data may be analyzed to generate a map or profile that illustrates regions of interest with the geological formation.

Based on the identified locations and properties of the hydrocarbon deposits, certain positions or parts of the geological formation 14 may be explored (block 42). That is, hydrocarbon exploration organizations may use the locations of the hydrocarbon deposits to determine locations at the surface of the geological formation 14 to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the geological formation 14, the hydrocarbons that are stored in the hydrocarbon deposits may be produced (block 44) via natural flowing wells, artificial lift wells, and the like. Further, the produced hydrocarbons may be transported (block 46) to refineries and the like via transport vehicles, pipelines, and the like. Further still, the produced hydrocarbons may be processed (block 48) according to various refining procedures to develop different products using the hydrocarbons.

It should be noted that the processes discussed with regard to the flow chart 38 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the geological formation.

Figure 3:
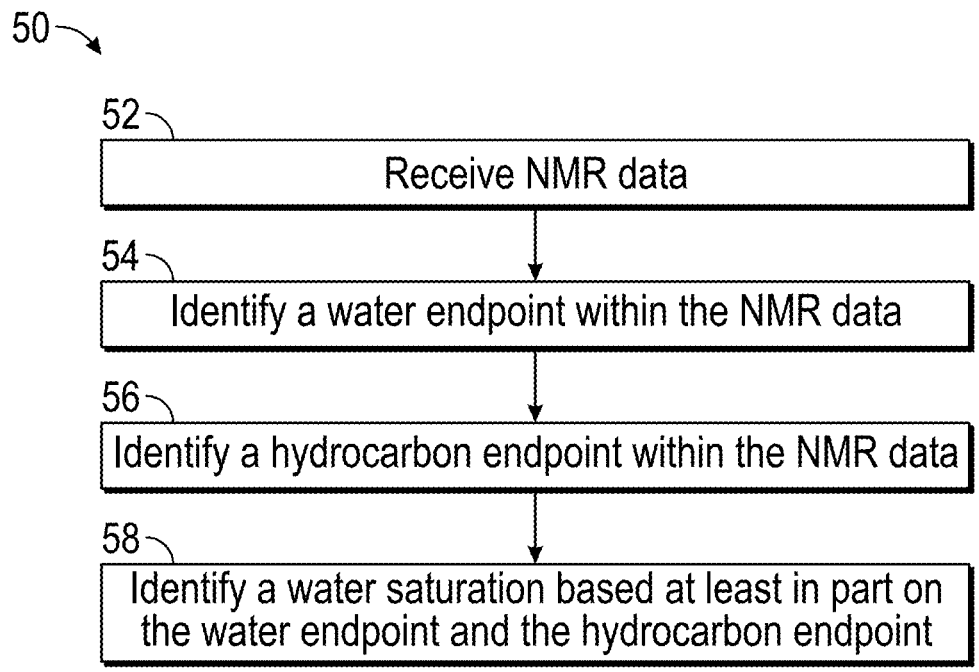
FIG. 3 is a flow chart of a process for determining saturated-water content, in accordance with an embodiment.

It should be appreciated that the well-log data referred to in locating hydrocarbons based on well-log data (block 40) may be NMR well log data. To further illustrate hydrocarbons may be located based on well log data, FIG. 3 shows a flow diagram 50 for determining water-saturation, in accordance with an embodiment of the present techniques. The elements illustrated in the flow diagram may be performed by the data processing system 28 or any suitable processing system.

The flow diagram 50 may include receiving (block 52) NMR data. For example, the NMR data may be generated by the downhole tool 12 and received by the data processing system 28 for generating well logs in methods such as logging while drilling. In some embodiments, the NMR data may be generated by the downhole 12, but the NMR data may be received by another suitable processing system as discussed above. The flow diagram also includes identifying (block 54) a water endpoint within the NMR data. As discussed herein, a water end refers to a T2 value, such as a T2 log-mean value, containing approximately 100% water. Further, the flow diagram 50 includes identifying (block 56) a hydrocarbon endpoint within the NMR data. Further still, the flow diagram 50 includes identifying (block 58) a water-saturation based at least in part on the water endpoint and the hydrocarbon endpoint. In some embodiments, the identified water saturation may be used to produce a visual representation of the well log data, such as a well log, that may have pixels that generally correlate to a position or location within a geological formation. As such, the well log produced based on the identified water saturation may include a position of a location of hydrocarbons and/or other liquids that are of interest for certain oil and gas production decisions.

The T2 log-mean, or geometric-mean, of a T2 distribution with n components is defined as:

$$T2lm^{\Sigma a_i} = T2_1^{a_{w1}} T2_2^{a_{w2}} (T2_1^{a_{hc1}} T2_2^{a_{hc2}} \ldots) \ldots T2_n^{a_{wn}} \quad (1)$$

Where T2lm is the T2 log-mean, and $a_{wi}$ and $a_{hci}$ are the amplitudes of the T2 component i of the water and hydrocarbon respectively.

Since Eq. 1 is associative and commutative, the individual components corresponding to water and hydrocarbon can be grouped together respectively, and since NMR amplitudes are calibrated into volumes, Eq. 1 becomes:

$$T2lm^{Vw+Vhc} = T2lm_w^{Vw} T2lm_{hc}^{Vhc} \quad (2)$$

where $\Sigma_{ai}$ is replaced by the total fluid volume Vw–Vhc, with Vw, Vhc denoting the volume of water and volume of hydrocarbon respectively.

Raising both sides of Eq. 2 to the power of 1/(Vw+Vhc), Eq. 2 becomes:

$$T2lm = T2lm_w^{Sw} T2lm_{hc}^{(1-Sw)} \quad (3)$$

Figure 4:
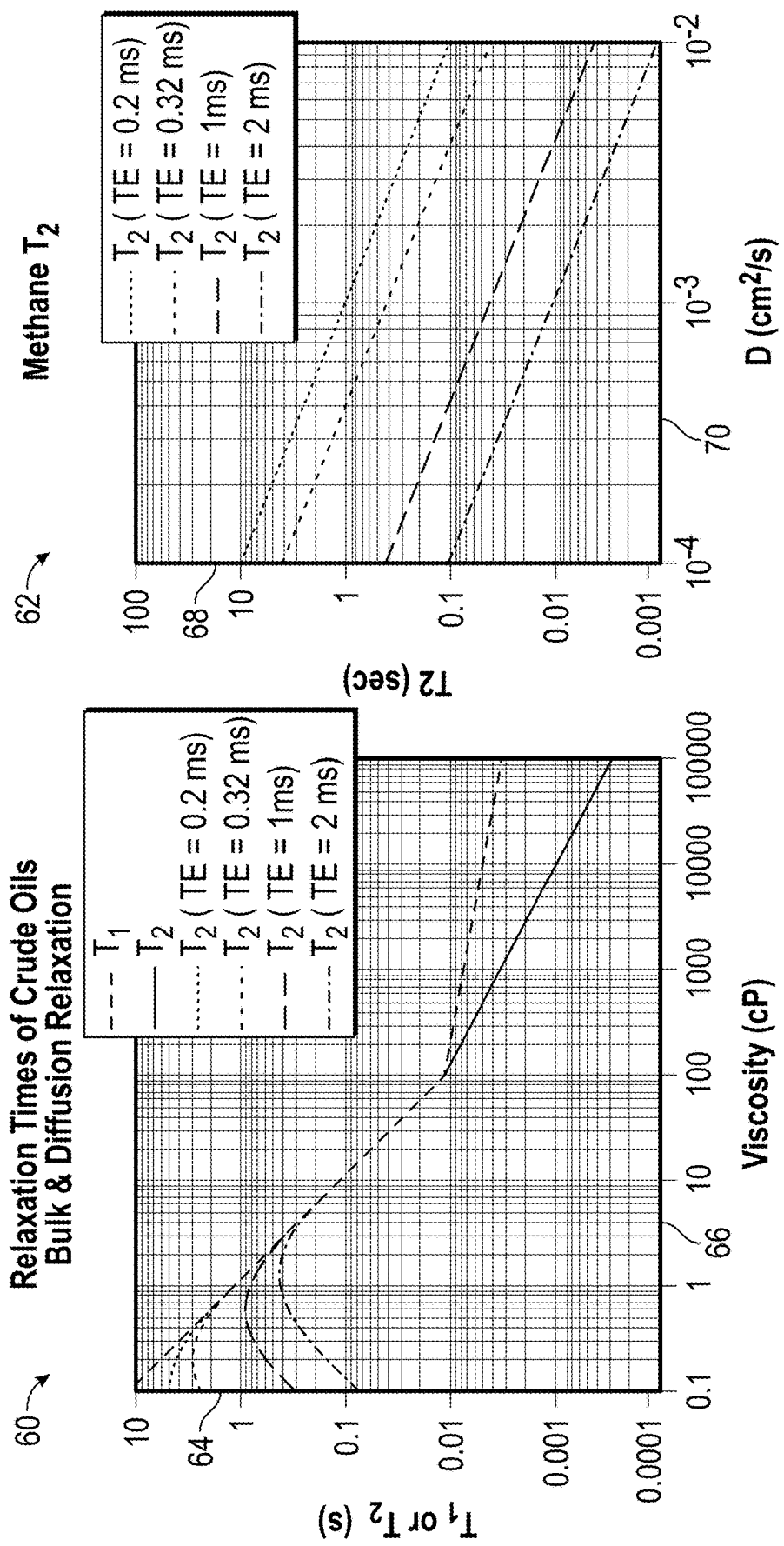
FIG. 4 shows graphs of T2 values for crude oils of different viscosity and methane having different diffusion values, respectively, in accordance with an embodiment.

Eq. 3 forms a basis to estimate Sw from a T2 distribution containing both water and hydrocarbon. The form of the equation indicates that Sw can be obtained by interpolating log(T2lm) between the water endpoint (e.g., log(T2lm$_w$)) and the hydrocarbon endpoint (e.g., log(T2lm$_{hc}$)). In Eq. 3, T2lm is determined from the measured T2 distribution data as per Eq. 1, and T2lm$_{hc}$ is determined from published charts as shown in FIG. 4. More specifically, FIG. 4 shows a graph 60 of T2 values for crude oils. As shown, the axis 62 is the T2 data, but in some embodiments, the axis may include or alternatively be T1 data, and the axis 64 is viscosity. FIG. 4 also shows a graph 70 of T2 values for methane in comparison to values of diffusion (D) measurements.

As discussed herein, T2 distributions containing overlapping sources (e.g., in this non-limiting example, water and hydrocarbons) may have a T2 value (e.g., T2lm$_w$) that varies with Sw. For example, as Sw decreases (e.g., as the amount of water in the region receiving NMR measurements decreases), T2lm$_w$ may shift to the left (e.g., to a shorter T2 time) of the 100% water T2 distribution. An example of this appears in FIG. 5, which shows a graph 70 of a signal on an axis 72 in comparison to T2 (ms) on an axis 74 for multiple hydrocarbon and water compositions 76. Hydrocarbon and water composition 76a represents a composition having approximately 100% kerosene. Hydrocarbon and water composition 76b represents a composition having 34% water and 66% kerosene. Hydrocarbon and water composition 76c represents a composition having 57% water and 43% kerosene. Hydrocarbon and water composition 76d represents a composition having 76% water and 24% kerosene. Hydrocarbon and water composition 76e represents a composition having approximately 100% water. A T2lm$_w$ peak position 78 and a T2lm$_{hc}$ peak position 80 occur for almost each hydrocarbon and water composition 76. Indeed, in general, the T2lm$_w$ peak position 78 shifts with Sw.

Figure 6A:
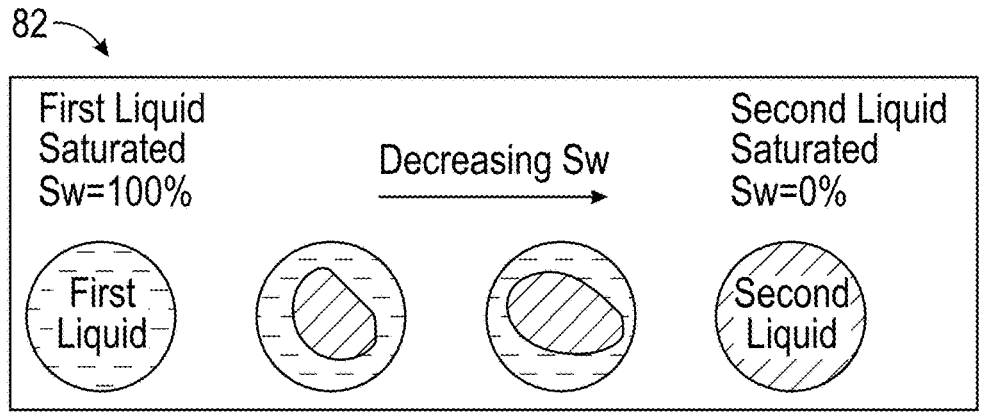
FIG. 6A is an illustration of the effects of saturated water on wetting volume, in accordance with an embodiment.
Figure 6B:
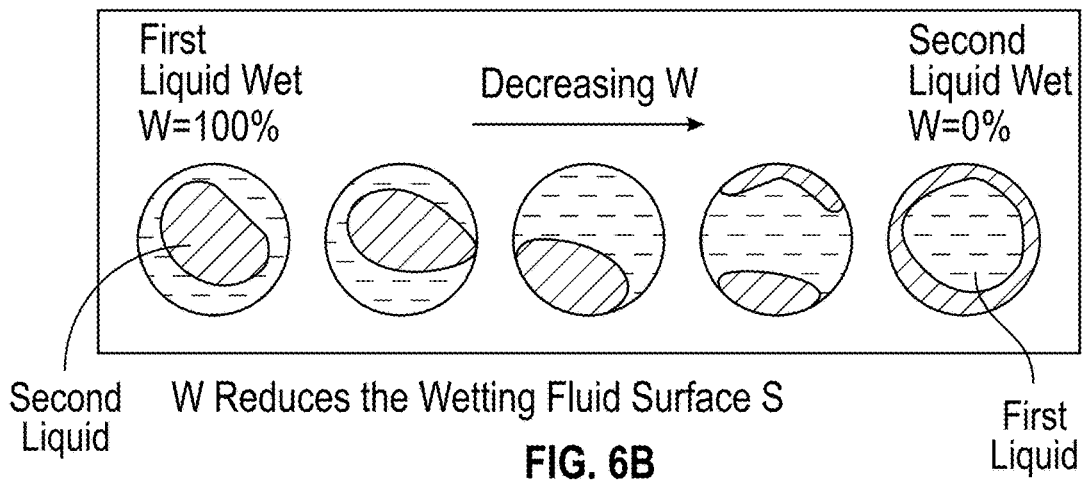
FIG. 6B is an illustration of the effects of the wettability factor on the wetting fluid surface, in accordance with an embodiment.

The cause of the shift of the T2lm$_w$ peak position 78 is illustrated in the T2 surface relaxation model shown in FIGS. 6A and 6B. The wetting fluid (water, in this example) volume may be reduced by Sw, while its surface is reduced by the wettability factor W. Thus, the T2 surface relaxation of the wetting fluid is shown in Eq. 4 below:

$$\frac{1}{T2lm_w} = \rho\left(\frac{W \cdot S}{Sw \cdot V}\right) \quad (4)$$

FIG. 6A is an illustration 82 of the effects of saturated of a first liquid, such as water, on wetting volume including a second liquid, such as a hydrocarbon, in accordance with an embodiment of the present techniques. FIG. 6B is an illustration 84 of the effects of the wettability factor on the wetting fluid surface, in accordance with the present techniques.

At Sw=100%, Eq. 4 reverts to:

$$\frac{1}{T2lm_{100\%w}} = \rho\left(\frac{W \cdot S}{V}\right) \quad (5)$$

Combining Eqs. 4 and 5:

$$T2lm_w = Sw \cdot T2lm_{100\%w} \quad (6)$$

Substituting T2lm$_w$ back into Eq. 3 gives:

$$T2lm = (Sw \cdot T2lm_{100\%w})^{Sw} T2lm_{hc}^{(1-Sw)} \quad (7)$$

In some embodiments, Sw may be solved for iteratively. For example, assuming Sw in the bracket=1, Sw may be solved as:

$$Sw1 = -(\log T2lm - \log T2lm_h)/(\log T2lm_{hc} - \log T2lm_{100\%w})$$

$$T2lm_{100\%w}1 = (Sw1\ T2lm_{100\%w})$$

$$Sw2 = -(\log T2lm - \log T2lm_h)/(\log T2lm_{hc} - \log T2lm_{100\%w}1)$$

Figure 5:
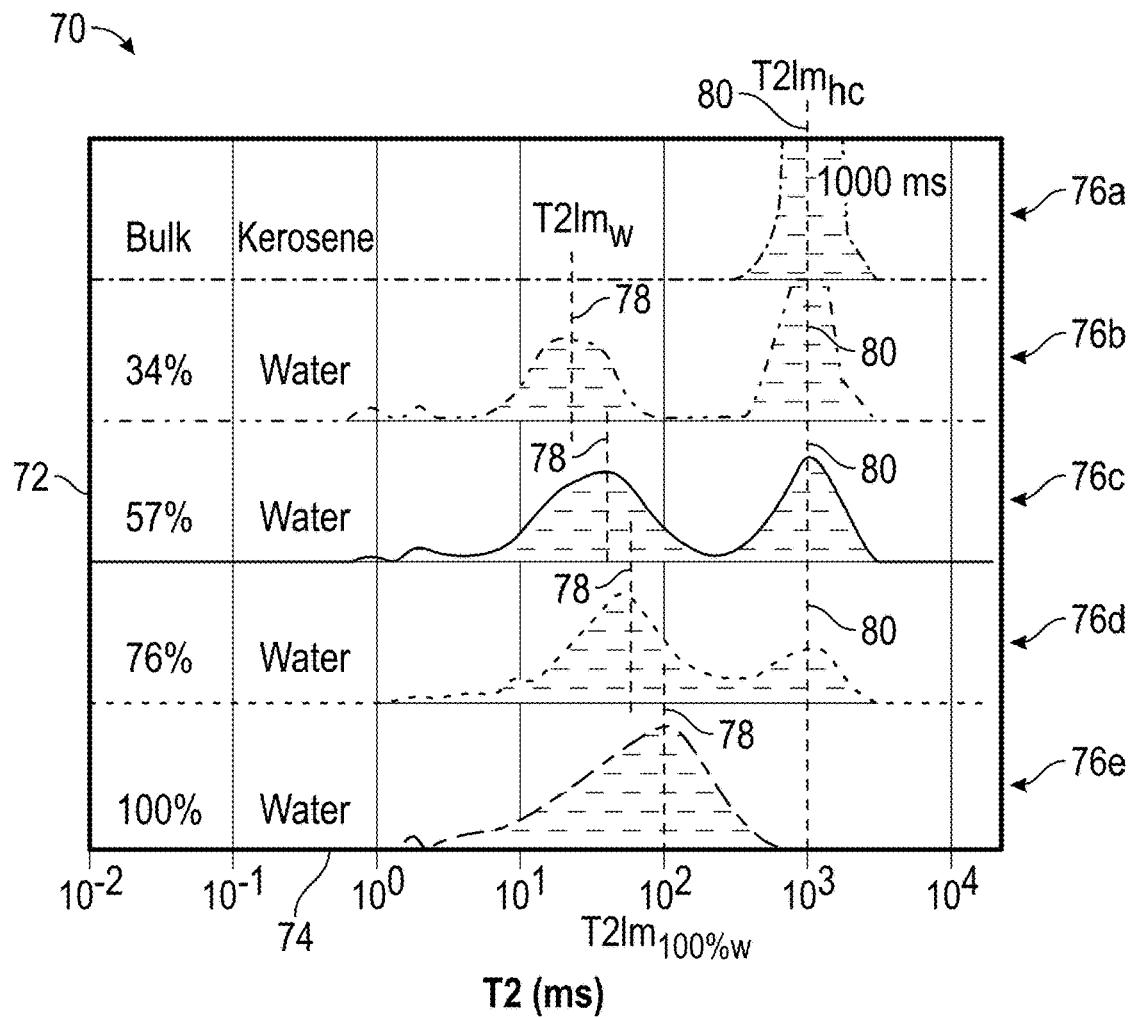
FIG. 5 is a graph showing T2 distributions varying with saturated water, in accordance with an embodiment.

T2lm$_{100\%w}$ can be estimated from NMR T2 fluids substitution. Eq. 7 allows solving numerically for Sw from a T2 distribution with a T2 log-mean T2lm. The fluid endpoints are T2lm$_{hc}$ and Sw·T2lm$_{100\%w}$. Eq. 7 can be solved by non-linear least squared methods or by recursive methods. The results of FIG. 5 are shown in FIG. 7 with T2lm$_{hc}$=1000 ms (as shown in the bulk kerosene T2 distribution) and T2lm$_{100\%w}$–100 ms (as shown in the 100% water T2 distribution).

Figure 7:
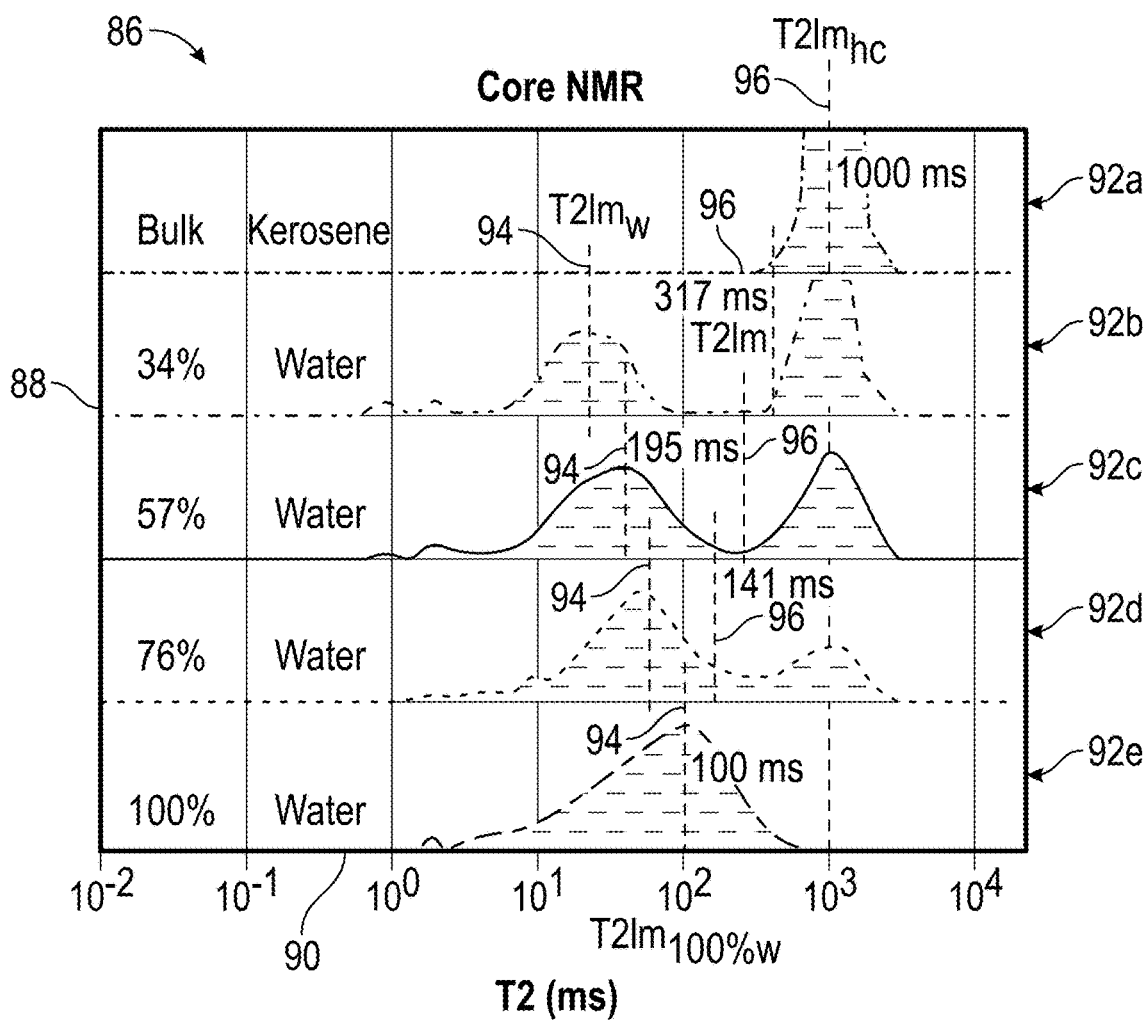
FIG. 7 is a graph showing saturation water and T2lm values, in accordance with an embodiment.

FIG. 7 is a graph showing saturation water and T2lm values, in accordance with an embodiment of the present techniques. In particular, FIG. 7 shows a graph 86 of a signal on an axis 88 in comparison to T2 (ms) on an axis 90 for multiple hydrocarbon and water compositions 92. Hydrocarbon and water composition 92a represents a composition having approximately 100% kerosene. Hydrocarbon and water composition 92b represents a composition having 34% water and 66% kerosene. Hydrocarbon and water composition 92c represents a composition having 57% water and 43% kerosene. Hydrocarbon and water composition 92d represents a composition having 92% water and 24% kerosene. Hydrocarbon and water composition 92e represents a composition having approximately 100% water. A T2lm$_w$ peak position 94 and a T2lm$_{hc}$ peak position 96 is shown for almost each hydrocarbon and water composition 92. Indeed, as in FIG. 5, the T2lm$_w$ peak position 94 shifts with varying Sw.

Figure 8:
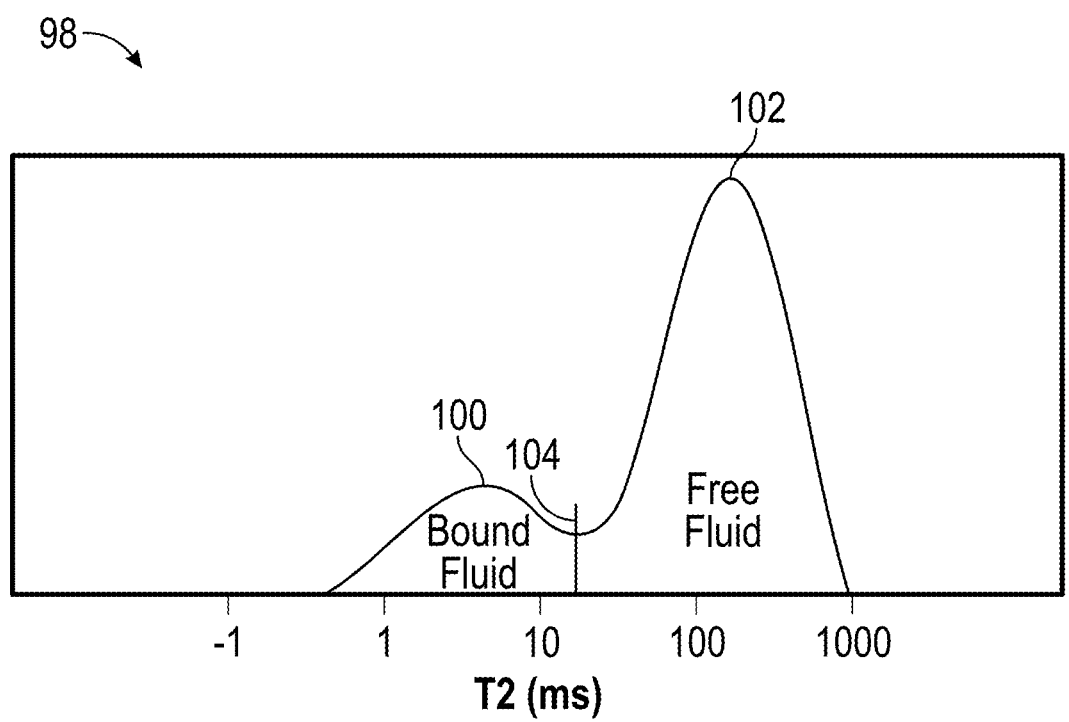
FIG. 8 is a graph showing an example of a T2 cutoff between bound fluid and free fluid, in accordance with an embodiment.

In an example embodiment, the T2 distribution is composed of bound fluid (e.g., peak 100) and free fluid (e.g., peak 102) assuming a T2 cutoff 104 as shown in FIG. 8. In some embodiments, the T2 cutoff 104 may be a single value. For example, T2 values lower than the T2 cutoff 104 may be included in the distribution around peak 100, and T2 values greater than the T2 cutoff 104 may be included in the distribution around peak 102. Assuming hydrocarbon is exclusively or not significantly present in the free fluid region, the T2 log-mean equation becomes:

$$T2lm^\phi = T2lm_{bf}^{bfv} T2lm_{ff}^{ffv} = T2lm_{bf}^{bfv} (T2lm_{fw}^{vwff} T2lm_{hc}^{vhc}) \quad (8)$$

where $\phi$ is total porosity, sum of bfv and ffv, bfv is bound fluid volume with its associated T2 log-mean $T2lm_{bf}$, ffv is free fluid volume with its associated T2 log-mean $T2lm_{ff}$, vwff is the free water volume with its associated T2 log-mean $T2lm_{ff}$, vhc is the hydrocarbon volume with its associated T2 log-mean $T2lm_{hc}$. As used herein, "ff" refers to free fluid and "bf" refers to bound fluid.

Raising both sides of Eq. 8 to the power of $1/\phi$, we obtain:

$$T2lm = T2lm_{bf}^{Swbf} T2lm_{fw}^{Swff} T2lm_{hc}^{Shc} \quad (9)$$

Since $T2lm_{fw}^{Swff} = Swff \cdot T2lm_{ff100\%w}$ as per Eq. 6 previously, Eq. 9 becomes:

$$T2lm = T2lm_{bf}^{Swbf} (Swff \cdot T2lm_{ff100\%w})^{Swff} T2lm_{hc}^{(1-Swbf-Swff)} \quad (10)$$

Adding mud filtrate gives:

$$T2lm = T2lm_{bf}^{Swbf} (Swff \cdot T2lm_{ff100\%w})^{Swff} T2lm_{hc}^{(1-Swbf-Swff-Smf)} T2lm_{mf}^{Smf} \quad (10)$$

Swff can be solved by minimizing the norm $\|(T2lm - \widetilde{T2lm})^2\|$ where T2lm is the measured value and $\widetilde{T2lm}$ is the theoretical value as per Eq. 10.

In some embodiments, Sw can be solved recursively by first, assuming Swff=1 in the term between brackets (Swff·$T2lm_{ff100\%w}$) and solve Eq. 10 analytically for Swff, then, reform the product (Swff·$T2lm_{ff100\%w}$) and solve Eq. 10 for a new Swff. The procedure is repeated until the subsequent Swff is within a set limit of the previous Swff.

The final Sw may then be the sum of the water saturation in the bound fluid bin and the water saturation in the free fluid bin:

$$Swt = Swbf + Swff; \quad (11)$$

$$Sw = (Swt - Sbw)/(1 - Sbw)$$

Figure 9:
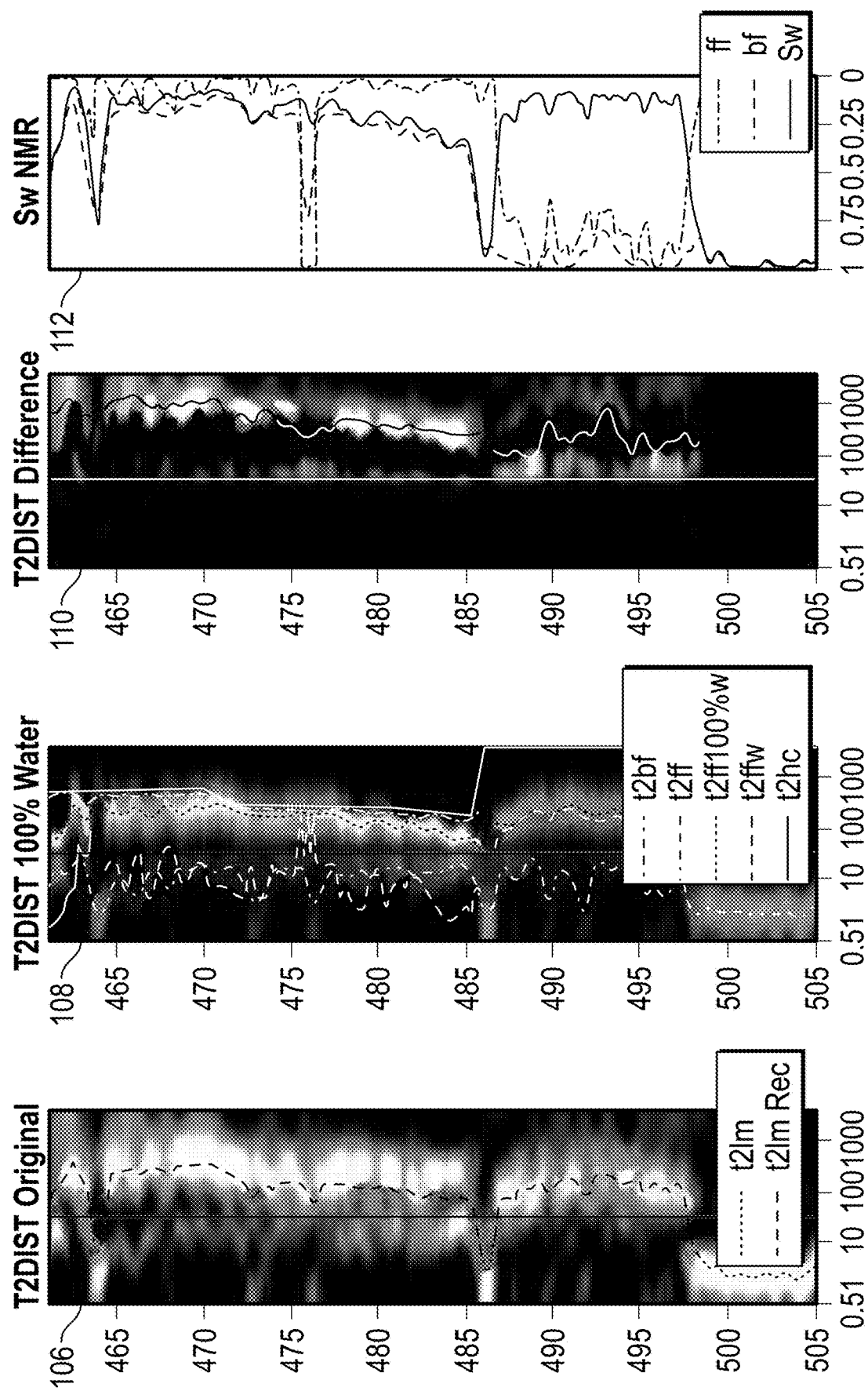
FIG. 9 shows multiple well logs of T2 data side-by-side with water saturation, in accordance with an embodiment.

As discussed herein, the water-saturation may be used to inform certain oil and gas production decisions. Certain techniques for informing the production decisions based on the well log data involve transforming the well log data into one or more visual representations (e.g., graphs and/or image data) that are presented as hard copies or on an electronic display, where each visual representation (e.g., well logs) may depict data resulting from one of the well log measurements. In some embodiments, the present techniques may be used to generate improved well logs. More specifically, the improved well logs may more accurately display the water-saturation than techniques used for producing certain conventional well logs based on NMR well log data. FIG. 9 shows multiple well logs of T2 data, in accordance with the present techniques. The LWD data was acquired while drilling the well with oil-based mud (OBM). The oil-water contact is at x486. Track 106 shows the original T2 distribution with the measured T2lm and the reconstructed T2lm. Track 108 shows the fluids-substituted 100% water T2 distribution with the following T2 curves: a curve relating to $T2lm_{bf}$ (t2bf), a curve relating to $T2lm_{ff}$ (t2ff), a curve relating to $T2lm_{ff100\%w}$ (t2ff100%w), a curve relating to $T2lm_{fw}$ (t2ffw), and a curve relating to $T2lm_{hc}$ (t2hc). Track 110 shows a difference T2 distribution describing a difference between the original T2 distribution in track 106 and the fluids-substituted 100% water T2 distribution in track 108. The difference T2 distribution captures the hydrocarbon signal. Track 112 shows the Sw curves: Swff, Swbf, and Sw. As such, a Sw may be calculated from NMR data having overlapping water and hydrocarbon NMR T2 distributions, which may provide more accurate well logs that provide improved techniques for informing oil and gas production decisions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method for identifying a liquid saturation from T2 nuclear magnetic resonance (NMR) data having a first component of T2 NMR data due to a first liquid that overlaps with a second component of T2 NMR data due to a second liquid, the method comprising:
   receiving T2 NMR data, wherein the T2 NMR data comprises first T2 NMR data due to the first liquid and second T2 NMR data due to the second liquid using a downhole tool configured to receive NMR data, and using a processor in communication with the downhole tool to;
   identify a first endpoint corresponding to a T2 peak of the first liquid in the absence of the second liquid based at least in part on the first T2 NMR data;
   identify a second endpoint corresponding to a T2 peak of the second liquid in the absence of the first liquid based at least in part on the second T2 NMR data; and
   identify a liquid saturation of a composition of the first liquid for a region of the T2 NMR data where the first T2 NMR data overlaps with the second T2 NMR data based at least in part on the first endpoint and the second endpoint.

2. The method of claim 1, wherein the first endpoint is identified based at least in part on effects of liquid saturation on a wetting volume related to the first liquid and the second liquid.

3. The method of claim 1, wherein the first endpoint or the second endpoint is identified based at least in part on T2 versus viscosity measurements or T2 versus diffusion measurements.

4. The method of claim 1, wherein the first liquid comprises water and the second liquid comprises at least one hydrocarbon.

5. The method of claim 1, wherein the liquid saturation relating a composition of the first liquid for an overlapping distribution region based at least in part on the first endpoint and the second endpoint comprises interpolating T2 log-mean data between the first endpoint and the second endpoint.

6. The method of claim 1, wherein the liquid saturation relating to the composition of the first liquid for an overlapping distribution region based on the first endpoint and the second endpoint comprises solving numerically for Sw from a T2 distribution having the first endpoint and the second endpoint.

7. The method of claim 1, wherein the liquid saturation is solved for iteratively based an assumed initial value for the liquid saturation.

8. The method of claim 1, comprising generating a well log that is a visual representation of the liquid saturation at one or more positions within a geological formation.

9. A system for identifying a water saturation from T2 nuclear magnetic resonance (NMR) data having a first component of T2 NMR data due to water that overlaps with a second component of T2 NMR data due to at least one hydrocarbon, comprising:
- a downhole tool configured to receive NMR data;
- a processor; and
- a memory storing instructions configured to be executed by the processor, the instructions comprising instructions to:
- receive T2 NMR data, wherein the T2 NMR data comprises first T2 NMR data due to water and second T2 NMR data due to the at least one hydrocarbon;
- identifying a first endpoint corresponding to a T2 peak of the water in the absence of the at least one hydrocarbon based at least in part on the first T2 NMR data;
- identify a second endpoint corresponding to a T2 peak of the at least one hydrocarbon in the absence of the water based at least in part on the second T2 NMR data;
- identify a cutoff point between the T2 peak of the water and the at least one hydrocarbon; and
- identify the water saturation relating to an amount of water for a region within a geological formation of the T2 NMR data where the first T2 NMR data overlaps with the second T2 NMR data based at least in part on the first endpoint, the second endpoint, and the cutoff point.

10. The system of claim 9, wherein the water saturation is identified based at least in part on a T2 log-mean relating to a free fluid volume (ffv), a T2 log-mean relating to a bound fluid volume (bfv), a T2 relating to a free water volume (vwff), a T2 log-mean relating to a hydrocarbon volume (vhc).

11. The system of claim 10, wherein the water saturation is identified recursively by solving for a first fluid saturation related to the bound fluid volume, a second fluid saturation related to the free fluid volume, or any combination thereof.

12. The system of claim 9, wherein the first endpoint is identified based at least in part on effects of the water on a wetting volume.

13. The system of claim 9, wherein identifying a liquid saturation relating to the composition of the water for an overlapping distribution region based on the water endpoint and a hydrocarbon endpoint comprises solving numerically for Sw from a T2 distribution having the first endpoint and the second endpoint.

14. The system of claim 9, wherein identifying a liquid saturation relating a composition of the water for an overlapping distribution region based at least in part on the first endpoint and the second endpoint comprises interpolating T2 log-mean data between the first endpoint and the second endpoint.

* * * * *